(12) United States Patent
Ishii et al.

(10) Patent No.: US 8,387,736 B2
(45) Date of Patent: Mar. 5, 2013

(54) FUEL SUPPLY APPARATUS AND MOTORCYCLE INCLUDING SAME

(75) Inventors: Tsubasa Ishii, Saitama (JP); Makoto Nakajin, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 13/011,121

(22) Filed: Jan. 21, 2011

(65) Prior Publication Data
US 2011/0186370 A1 Aug. 4, 2011

(30) Foreign Application Priority Data

Jan. 29, 2010 (JP) ................................ 2010-019206

(51) Int. Cl.
*F02M 37/20* (2006.01)
(52) U.S. Cl. ....................................................... 180/219
(58) Field of Classification Search .................. 180/219
See application file for complete search history.

(56) References Cited

U.S. PATENT DOCUMENTS

| | | | | |
|---|---|---|---|---|
| 5,769,041 | A * | 6/1998 | Suzuki et al. ................ | 123/73 C |
| 6,073,719 | A * | 6/2000 | Ohmika et al. .............. | 180/219 |
| 6,986,400 | B2 * | 1/2006 | Osada ........................... | 180/228 |
| 7,302,934 | B2 * | 12/2007 | Ishii et al. .................... | 123/445 |
| 7,484,766 | B2 * | 2/2009 | Iwasaki ........................ | 280/833 |
| 7,681,920 | B2 * | 3/2010 | Iwasaki ........................ | 280/831 |
| 7,703,569 | B2 * | 4/2010 | Miyabe ......................... | 180/219 |
| 2004/0079340 | A1 * | 4/2004 | Matsuda et al. .............. | 123/472 |
| 2006/0066092 | A1 * | 3/2006 | Miyabe ......................... | 280/833 |
| 2007/0089921 | A1 * | 4/2007 | Miyabe ......................... | 180/219 |
| 2007/0089922 | A1 * | 4/2007 | Iwasaki ........................ | 180/219 |
| 2007/0175688 | A1 * | 8/2007 | Ishii et al. .................... | 180/219 |
| 2009/0217911 | A1 * | 9/2009 | Yokura et al. ................ | 123/457 |
| 2010/0078241 | A1 * | 4/2010 | Maeda et al. ................ | 180/68.3 |
| 2011/0073397 | A1 * | 3/2011 | Yamada et al. .............. | 180/219 |
| 2011/0073400 | A1 * | 3/2011 | Nakajin et al. .............. | 180/219 |
| 2011/0239750 | A1 * | 10/2011 | Abe et al. .................... | 73/114.45 |

FOREIGN PATENT DOCUMENTS

JP 2009-209909 A 9/2009

* cited by examiner

*Primary Examiner* — Kevin Hurley
*Assistant Examiner* — Michael Stabley
(74) *Attorney, Agent, or Firm* — Carrier Blackman & Associates, P.C.; William D. Blackman; Joseph P. Carrier

(57) ABSTRACT

A fuel supply apparatus is provided having an increased curvature of radius of a fuel pipe. The fuel supply apparatus is provided with a pressure regulator, disposed at a middle portion of a fuel supply pipe interconnecting a fuel pump and an injector, in which fuel is supplied to the pressure regulator from the fuel pump via the fuel pipe, and is then supplied from the pressure regulator to the injector via a fuel pipe and extra fuel is returned from the pressure regulator to a fuel tank via a return pipe. The pressure regulator is disposed in front of a storage box, the fuel pipe and the return pipe are disposed on opposite sides of the storage box, respectively, the pressure regulator is disposed in front of the storage box, and the fuel pipe and the return pipe are disposed in a substantially U-shaped configuration.

18 Claims, 9 Drawing Sheets

FUEL SUPPLY APPARATUS AND MOTORCYCLE INCLUDING SAME

CROSS-REFERENCE TO RELATED APPLICATIONS

The present invention claims priority under 35 USC 119 based on Japanese patent application No. 2010-019206, filed on Jan. 29, 2010. The entire subject matter of this priority document, including specification claims and drawings thereof, is incorporated by reference herein.

BACKGROUND OF THE INVENTION

1. Technical Field

The present invention relates to an improved fuel supply apparatus for a motorcycle.

2. Background Art

As a conventional fuel supply apparatus, there is known a apparatus in which a plurality of fuel pipes interconnect a fuel tank side and a fuel injector side which injects and supplies fuel into an engine (for example, refer to Patent Document 1).

According to FIGS. 2 and 3 in Patent Document 1, a fuel pump 81 is provided inside a fuel tank 33, a fuel filter 83 is connected to the fuel pump 81 via a supply pipe 82, a fuel pressure regulator 85 is connected to the fuel filter 83 via a fuel hose 84, a fuel injector 50 is connected to the fuel pressure regulator 85 via a connection pipe 86, and a return hose 87 is connected from the fuel pressure regulator 85 to a bottom of the fuel tank 33.

[Patent Document 1] JP-A No. 2009-209909

In FIG. 3 of Patent Document 1, since the supply pipe 82, the fuel hose 84, the connection pipe 86, and the return hose 87 have portions which are bent with a small radius, stress concentration is easy to occur.

SUMMARY OF THE INVENTION

An object of the present invention is to provide a fuel supply apparatus that allows these fuel pipes to be bent with a larger radius.

In a fuel supply apparatus according to a first aspect of the present invention, a storage box is provided below a seat of a motorcycle and a fuel tank is provided behind the storage box, an intake air routing structure and a fuel injection apparatus for an engine is disposed behind the storage box, fuel in the fuel tank being fed under pressure into the fuel injection apparatus by a fuel pump disposed inside the fuel tank, a pressure regulator is disposed at a middle portion of fuel supply piping interconnecting the fuel pump and the fuel injection apparatus, fuel is supplied from the fuel pump to the pressure regulator via a first supply pipe of the fuel supply piping, fuel being supplied from the pressure regulator to the fuel injection apparatus via a second supply pipe of the fuel supply piping and excess fuel being returned from the pressure regulator to the fuel tank via a return pipe, and wherein the pressure regulator is disposed in front of the storage box; the first supply pipe and the return pipe are disposed on one side and another side of the storage box via the pressure regulator; and the first supply pipe and the return pipe are disposed so as to form a Substantially U-shaped configuration.

In a fuel supply apparatus according to a second aspect of the present invention, in addition to the first aspect, the first supply pipe and the return pipe are connected to one side and the other side respectively, across the vehicle body, of the pressure regulator.

In a fuel supply apparatus according to a third aspect of the present invention, in addition to the first aspect, the engine is provided with a cylinder portion projecting forward horizontally, the pressure regulator is disposed above a crankcase of the engine and behind the fuel injection apparatus, and the second supply pipe is disposed along a vehicle body frame extending in a longitudinal direction.

In a fuel supply apparatus according to a fourth aspect of the present invention, in addition to the first aspect, the vehicle body frame is provided with one main frame extending obliquely downward and rearward from a head pipe and a seat frame bifurcated left and right from the main frame in front of the storage box; the pressure regulator is disposed between the left and right seat frame sections in a top plan view; and a rear end of the second supply pipe is connected to a front side joint portion provided on the pressure regulator and extends in a curve from one of left and right edges of the main frame over the main frame to downward of the main frame above a cylinder portion and within the left and right width of the cylinder portion so that the front end of the second supply pipe is connected to the fuel injection apparatus.

In a fuel supply apparatus according to a fifth aspect of the present invention, in addition to the first aspect, a rear wheel of the motorcycle is attached to a rear end of a swing arm supported by the vehicle body frame swingably up and down; and a fuel filter disposed at a middle portion of the first supply pipe is disposed within a swingable range of the rear wheel in a side view.

In a fuel supply apparatus according to a sixth aspect of the present invention, in addition to the first aspect, the first supply pipe, the return pipe, the fuel filter, and the pressure regulator are disposed inside the vehicle body frame in the top plan view; and a leg shield covering the legs of an occupant sitting on the seat from the front covers the second supply pipe at a rear of the center portion thereof.

In a fuel supply apparatus according to a seventh aspect of the present invention, in addition to the first aspect, fuel contains ethanol, ethanol concentration in fuel is determined from components of an exhaust gas from the engine, and control of fuel injection by the fuel injection apparatus is switched according to the ethanol concentration; and the second supply pipe is made of a rubber hose.

In a fuel supply apparatus according to an eighth aspect of the present invention, in addition to the first aspect, the first supply pipe and the return pipe are made of a resin hose.

In a fuel supply apparatus according to a ninth aspect of the present invention, in addition to the first aspect, the fuel pump is provided with a fuel discharge joint passing through a flange that closes an opening in a top surface of the fuel tank and bends toward one side in a vehicle width direction; and the first supply pipe is connected to the fuel discharge joint from one side in the vehicle width direction.

In a fuel supply apparatus according to a tenth aspect of the present invention, in addition to the first aspect, the seat is of a tandem type having front and back seating portions for allowing two persons to sit thereon; and a stepped portion is formed between the front and back seating portions and the fuel discharge joint is provided below the stepped portion.

ADVANTAGEOUS EFFECTS OF INVENTION

In the invention according to the first aspect hereof, the pressure regulator is disposed in front of the storage box, the first supply pipe and the return pipe are disposed at one side and the other side of the storage box via the pressure regulator, and the first supply pipe and the return pipe are arranged so as to form a Substantially U-shaped configuration. Since the first supply pipe and the return pipe are arranged in the Substantially U-shaped configuration, it is possible to make a curve formed by the first supply pipe and the return pipe gentle with a simple construction and thereby to prevent stress concentration.

In the invention according to the second aspect hereof, since the first supply pipe and the return pipe are connected respectively to one side and the other side in the vehicle width direction, of the pressure regulator, it is possible to shorten the curved portions of the first supply pipe and the return pipe by reducing the curved portions, and thereby to make it easier to dispose the first supply pipe and the return pipe and also reduce the cost thereof.

In the invention according to the third aspect hereof, since the engine is provided with the cylinder portion horizontally projecting forward, the pressure regulator is disposed above the crankcase of the engine and behind the fuel injection apparatus, and the second supply pipe is disposed along the vehicle body frame extending forward and backward, it is possible to protect the pressure regulator with the crankcase of the engine and also to protect the second supply pipe with the vehicle body frame.

Furthermore, since the engine has the horizontal cylinder portion, it is possible to make a lateral distance between the pressure regulator and the fuel injection apparatus longer as compared to, for example, an engine whose cylinder portion extends upward from the crankcase.

Accordingly, it is possible to increase the capacity of the second fuel supply pipe and thereby suppress fuel pulsation, and also simplify the layout of the second supply pipe by extending it straight.

In the invention according to the fourth aspect hereof, the vehicle body frame includes: one main frame extending obliquely downward behind the head pipe; and a seat frame bifurcating left and right from the main frame in front of the storage box, and wherein: the pressure regulator is disposed between the left and right seat frame sections in a top plan view; and the second supply pipe is connected to, at a rear end thereof, a front side joint portion provided on the pressure regulator, and extends downward in a curve above the main frame from one of left and right edges of the main frame, above the cylinder portion and within the lateral width of the cylinder portion and then a front edge thereof is connected to the fuel injection apparatus. This allows the second supply pipe to be protected with the vehicle body frame and the cylinder portion.

In the invention according to the fifth aspect hereof, since the rear wheel of the motorcycle is attached to a rear end of the swing arm that is vertically swingably supported by the vehicle body frame, and the fuel filter disposed at a middle portion of the first supply pipe is disposed within a swingable range of the rear wheel in a side view, it is possible to easily prevent an interference between the fuel filter and the rear wheel by disposing the fuel filter on one side in the vehicle width direction.

In the invention according to the sixth aspect hereof, since the first supply pipe, the return pipe, the fuel filter, and the pressure regulator are disposed inside the vehicle body frame in the top plan view, and a leg shield covering legs of an occupant sitting on the seat from the front thereof covers the second supply pipe at an end of the center of the leg shield, it is possible to protect the first supply pipe, the return pipe, the fuel filter, and the pressure regulator with the vehicle body frame, thus allowing the appearance to be improved by covering the pressure regulator with the leg shield. Also, a special cover member to cover the pressure regulator is not necessary and thus the number of components can be reduced.

In the invention according to the seventh aspect hereof, since the fuel contains ethanol, ethanol concentration in the fuel can be determined by a control apparatus from components of exhaust gas from the engine, fuel injection control by the fuel injection apparatus is switched based on the ethanol concentration, and the second supply pipe is made of a rubber hose, it is possible to suppress a pulsation of the fuel fed to the fuel injection apparatus by employing a flexible rubber hose for the second supply pipe, thus allowing combustion of the engine to be stabilized.

Furthermore, switching of the fuel injection control by the fuel injection apparatus based on ethanol concentration by the control apparatus enables appropriate control of engine combustion and enhancement of engine performance.

In the invention according to the eighth aspect hereof, since the first supply pipe and the return pipe are each made of a resin hose, outer diameters of the first supply pipe and the return pipe can be reduced, a piping work can be facilitated particularly for a small vehicle with a small body space, and also it is possible to reduce the cost than for rubber hoses.

In the invention according to the ninth aspect hereof, since the fuel pump is provided with the fuel discharge joint passing through the flange which closes an opening in the top surface of the fuel tank and bends toward one side in the vehicle width direction, and the first supply pipe is connected to the fuel discharge joint from one side in the vehicle width direction, it is possible to easily dispose the first supply pipe on one side in the vehicle width direction.

In the invention according to the tenth aspect hereof, since the seat is of the tandem type having front and rear seat portions that enables the seating of two persons, the stepped portion is formed between the front and rear seat portions, and the fuel discharge joint is provided below the stepped portion, it is possible to secure a seat thickness even if the fuel discharge joint projecting upward is provided. Therefore, a comfortable ride can be maintained.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for clarifying the described embodiments of the present invention are described herein. Other conventional structures, and those of ancillary and auxiliary components of the system, will be known and understood by those in the art.

An embodiment of the present invention will be described below, with reference to the accompanying drawings. Note that the left, right, front, and rear in the description designate the directions as viewed from a vantage point of a rider of the motorcycle, seated thereon and facing forward. Also, the drawings are to be seen as indicated by the signs and an arrow (FRONT) in drawing indicates the frontward direction of a vehicle.

A first embodiment of the present invention will now be described.

Figure 1:
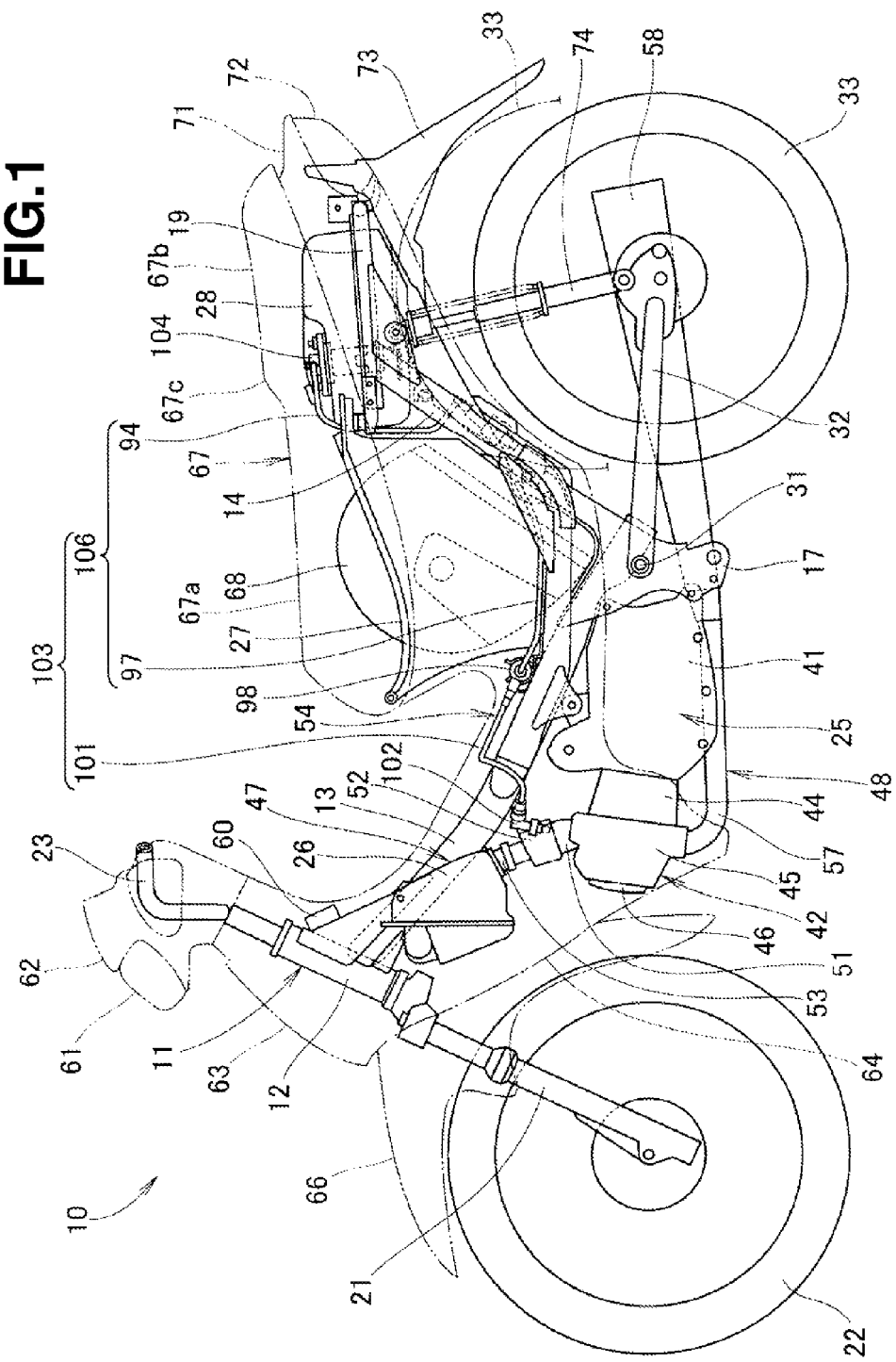
FIG. 1 is a side view of a motorcycle provided with a fuel supply apparatus according to an illustrative embodiment of the present invention.

As shown in FIG. 1, a motorcycle 10 includes a vehicle body frame 11 as a skeleton, and the vehicle body frame 11 includes a head pipe 12 composing a front end portion; one main frame section 13 extending obliquely downward and rearward from the head pipe 12; a pair of left and right rear frame sections 14, 16 (only the near reference sign 14 is shown) extending obliquely upward and rearward from left and right sides, respectively, of a center portion of the main frame section 13; and a pair of left and right pivot plates 17, 18 (only the near reference sign 17 is shown) attached to an rear end portion of the main frame section 13.

The rear frame sections 14, 16 are also attached to the corresponding pivot plates 17, 18, and are provided with a rear-end extending portion 19 provided substantially horizontally at a rear end portion thereof.

A front fork 21 is steerably attached to the head pipe 12, a front wheel 22 is attached to a lower end of the front fork 21 and a handlebar 23 is attached to an upper end thereof.

An upper portion of an engine 25 is attached to a rear portion of the main frame section 13, and an air cleaner 26 is attached to a front portion thereof.

The rear frame sections 14, 16 support a lower portion of a storage box 27 at front and center portions thereof, and support a rear end of the storage box 27 and a fuel tank 28 thereon at a rear portion, specifically at the rear-end extending portion 19 thereof.

A rear end portion of the engine 25 is attached to front portions of the pivot plates 17, 18, and a swing arm 32 is attached swingably up and down to a center portion thereof via a pivot axis 31.

A rear wheel 33 is attached to a rear end portion of the swing arm 32.

The rear wheel 33 can be shifted up to a position indicated by a dashed two-dot line by swinging upward the swing arm 32.

The engine 25 includes a crankcase 41 and a cylinder portion 42 attached to a front end portion of the crankcase 41 so as to extend forward, and the crankcase 41 has a transmission inside it.

The cylinder portion 42 includes a cylinder block 44 attached to the crankcase 41, a cylinder head 45 attached to the cylinder block 44, and a head cover 46 covering an opening of the cylinder head 45.

The cylinder head 45 has an intake air routing structure 47 connected to an upper portion thereof and an exhaust apparatus 48 connected to a lower portion thereof.

The intake air routing structure 47 includes an intake pipe 51 connected to an upper portion of the cylinder head 45, a throttle body 52 connected to the intake pipe 51, and the air cleaner 26 connected to the throttle body 52 via a connecting tube 53.

The exhaust apparatus 48 comprises an exhaust pipe 57 connected to a lower portion of the cylinder head 45 and a muffler 58 connected to a rear end of the exhaust pipe 57.

A fuel supply apparatus 54 is connected to the throttle body 52. The fuel supply apparatus 54 feeds fuel, containing ethanol, from the fuel tank 28 to the engine 25.

At a front portion of the vehicle body frame 11, there is provided an engine control unit 60 (hereinafter called "ECU 60") that controls the ignition timing of the engine 25, the amount of fuel injected from an injector 102 to be described later, fuel injection timing, and other appropriate functions of the motorcycle 10.

The ECU 60, for example, determines ethanol concentration in fuel, based on a signal from an O2 sensor (not shown) that detects oxygen in an exhaust gas from the engine 25, and according to the ethanol concentration, switches control of fuel injection from the injector 102.

In the drawing, reference number 61 designates a head lamp, 62 a handlebar cover, 63 a front cover, 64 a leg shield, 66 a front fender, 67 a seat, 68 an occupant's helmet, 71 a rear cover, 72 a tail lamp, 73 a rear fender, and 74 a rear shock absorber.

Figure 2:
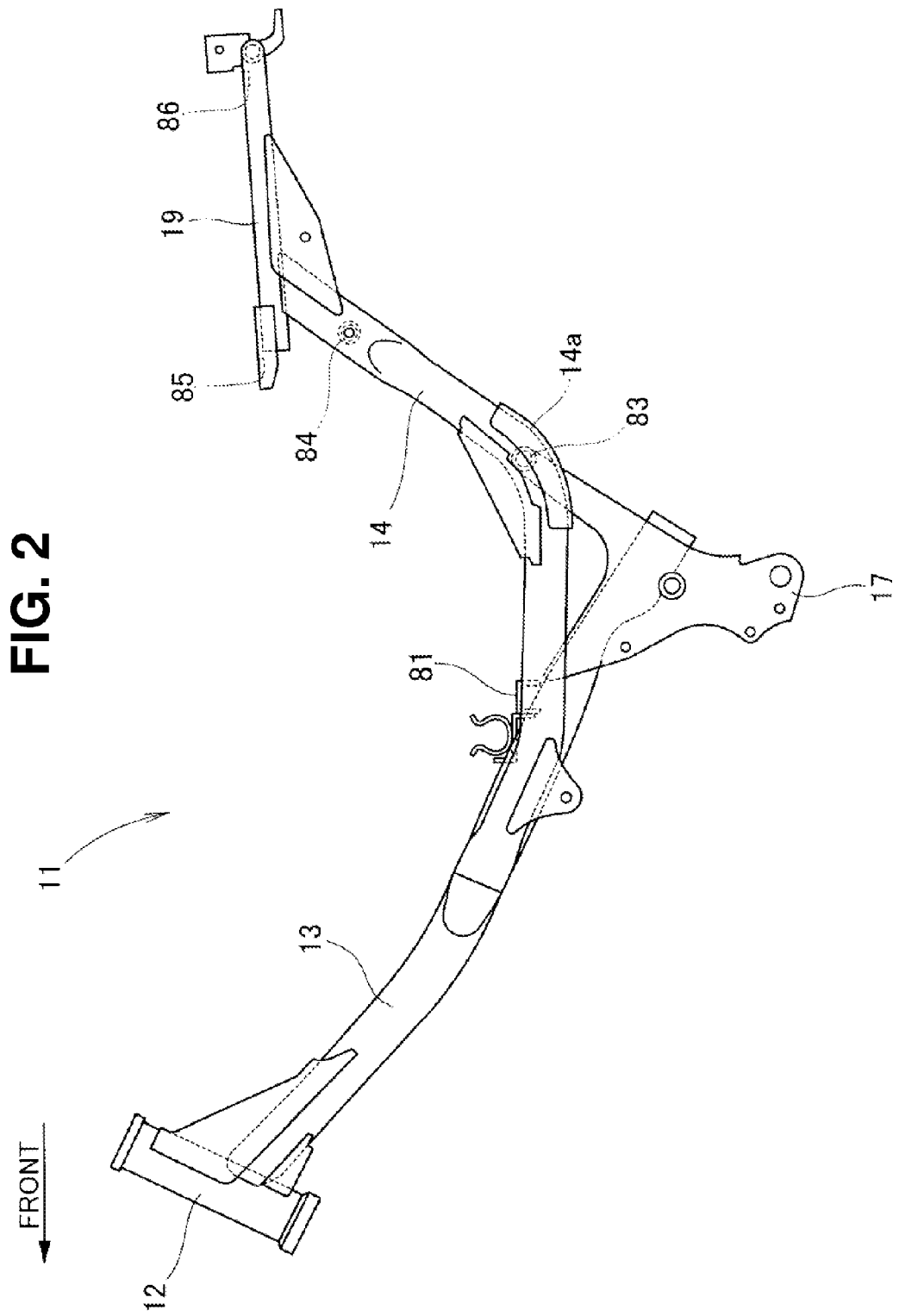
FIG. 2 is a side view of a vehicle body frame of the motorcycle according to the illustrative embodiment.

As shown in FIG. 2, the rear frame sections 14, 16 (only near reference sign 14 is shown) are interconnected by the following components: a central cross member 81 located at the front portion thereof, having a recessed cross-section and extending in the vehicle width direction, a first cross pipe 83 located at the center portion thereof, specifically at bent portions 14a, 16a (only the near reference sign 14a is shown), and extending in the vehicle width direction, and a second cross pipe 84 located at the rear portion thereof and extending in the vehicle width direction.

The central cross member 81 supports a bottom portion of the storage box 27 thereon (refer to FIGS. 1 and 3), and rear end portions of the left and right pivot plates 17, 18 (only the near reference sign 17 is shown) are attached to the first cross pipe 83. Accordingly, the rear frame sections 14, 16 and the pivot plates 17, 18 are connected via the first cross pipe 83.

The rear frame sections 14, 16 have a pair of left and right nuts 85, 85 (only the near reference sign 85 is shown) and nuts 86, 86 (only one reference sign 86 is shown) installed at front and rear end portions of the rear-end extending portion 19, and the storage box 27 and the fuel tank 28 (refer to FIG. 1) are attached to the rear-end extending portion 19 with the nuts 85, 86 and unshown bolts.

Figure 3:
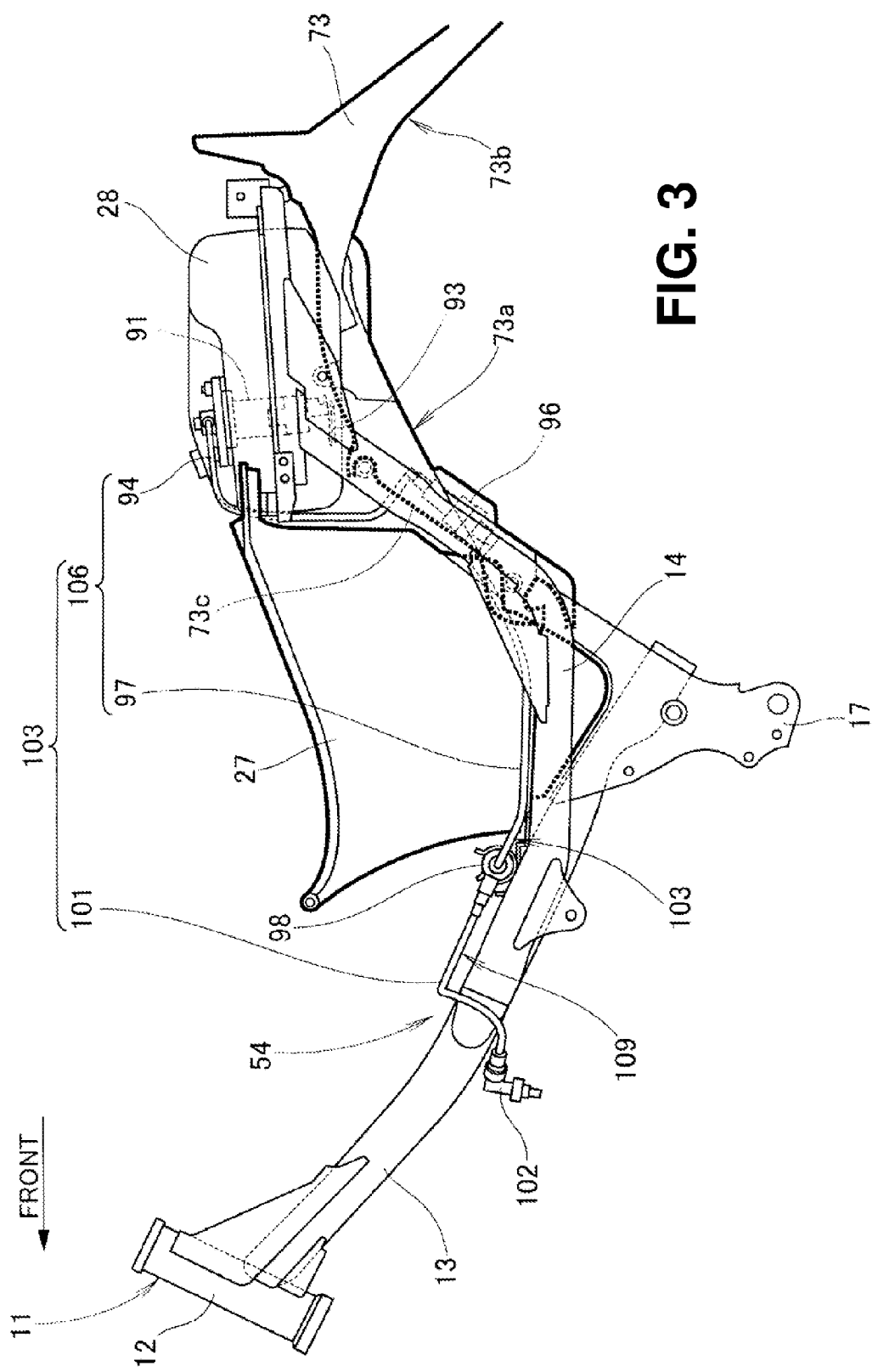
FIG. 3 is a side view of the fuel supply apparatus and a surrounding area thereof of the motorcycle according to the illustrative embodiment.

In FIG. 3, in order to make it easy to understand the shapes of the storage box 27 and the rear fender 73, the storage box 27 and the rear fender 73 are shown with bold outlines.

As shown in FIG. 3, the fuel supply apparatus 54 includes: the fuel tank 28; a fuel pump 91 housed inside of, and mounted to a top portion of the fuel tank 28; a primary fuel filter 93 attached to the fuel pump 91; a secondary fuel filter 96 connected to the fuel pump 91 attached with the primary fuel filter 93 via a fuel pipe 94; the pressure regulator 98 connected to the secondary fuel filter 96 via a fuel pipe 97; the injector 102 connected to the pressure regulator 98 via a fuel pipe (a secondary supply pipe) 101; and the return pipe 118 (refer to FIG. 6) connecting the pressure regulator 98 and the fuel tank 28. The injector 102 is attached to the throttle body 52 of the intake air routing structure 47 (refer to FIG. 1) in a manner so as to dispense measured amounts of fuel into the interior of the throttle body over time, during operation of the engine 25.

In the fuel supply apparatus 54, fuel routing structure 103 is formed that feeds fuel from the fuel tank 28 to the throttle body 52 on the side of the engine 25 (refer to FIG. 1).

The fuel routing structure 103 includes fuel pipes 94, 97, and 101, of which the fuel pipes 94 and 97 constitute sections of a first fuel supply pipe 106, extending from the fuel pump 91 to the pressure regulator 98.

Figure 4:
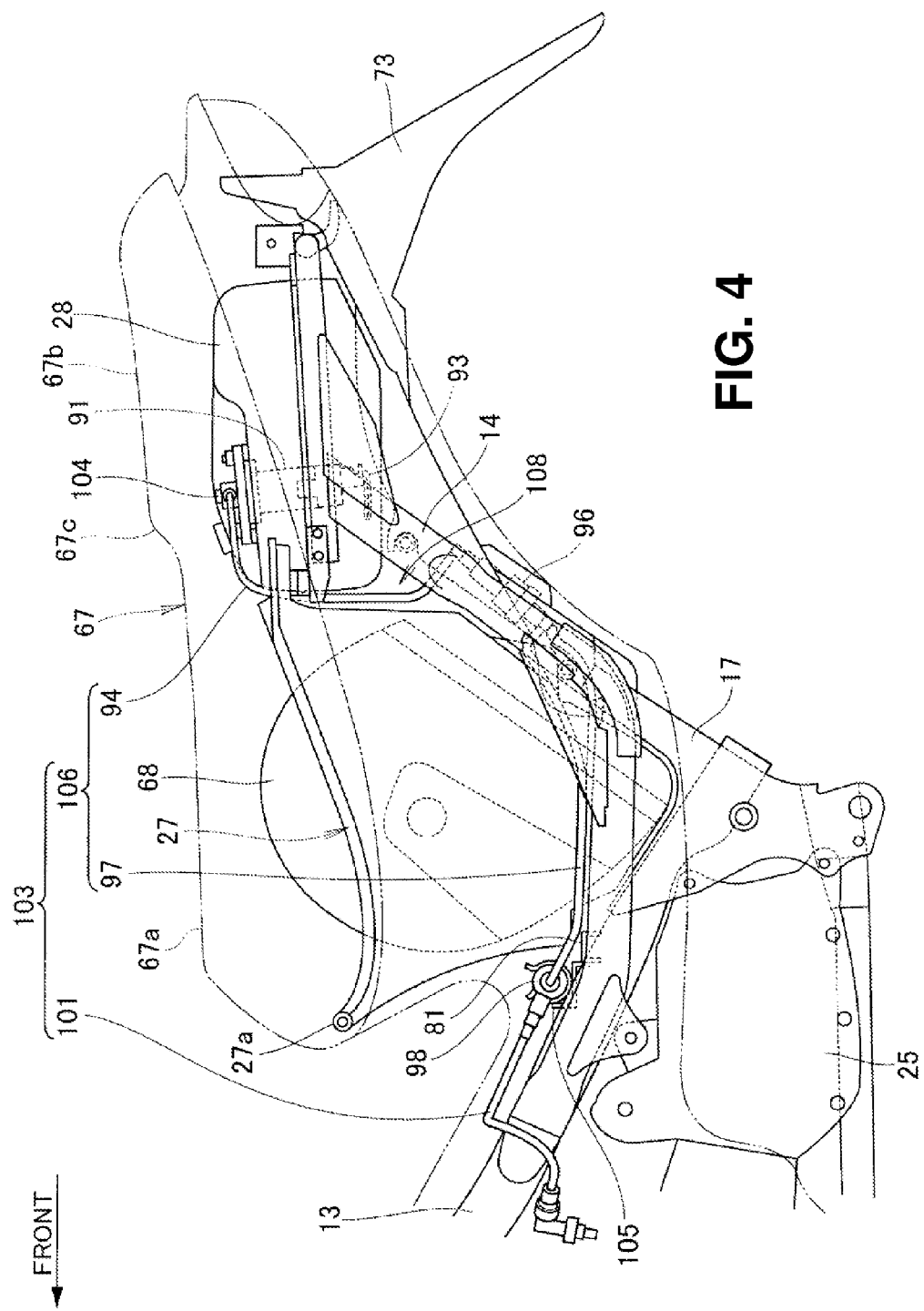
FIG. 4 is a cross-sectional view of a substantial part of the motorcycle according to the illustrative embodiment.

As shown in FIG. 4, the storage box 27 is formed so large that a full-face type helmet 68 can be stored therein. Note that reference number 27a refers to a seat-mounting portion provided at a front end portion of the storage box 27, in order to mount the seat 67 on the storage box 27.

The seat 67 is of the tandem type composed of a rider's seat 67a for supporting a primary rider (vehicle operator), and a pillion passenger seat 67b, that is formed behind and at a position one step higher than the rider's seat 67a, for supporting a passenger thereon behind the primary rider.

A stepped portion 67c is formed between the rider's seat 67a and the pillion passenger seat 67b, and an upper end of the fuel pump 91 is disposed below the stepped portion 67c.

The fuel pump 91 is provided with a fuel discharge portion 104 projecting upwardly at the top thereof, and the fuel pipe 94 is connected to the fuel discharge portion 104.

The secondary fuel filter 96 is removably attached to an upper surface of the rear fender 73, and is disposed between the storage box 27 and the rear fender 73 and between the left and right rear frame sections 14, 16 (only the near reference sign 14 is shown).

The pressure regulator 98 is removably held by a regulator bracket 105 attached to a front portion of the central cross member 81, and is disposed in front of the storage box 27 and above the main frame section 13, above front portions of the rear frame sections 14, 16, and above the central cross member 81 in a side view.

Figure 5:
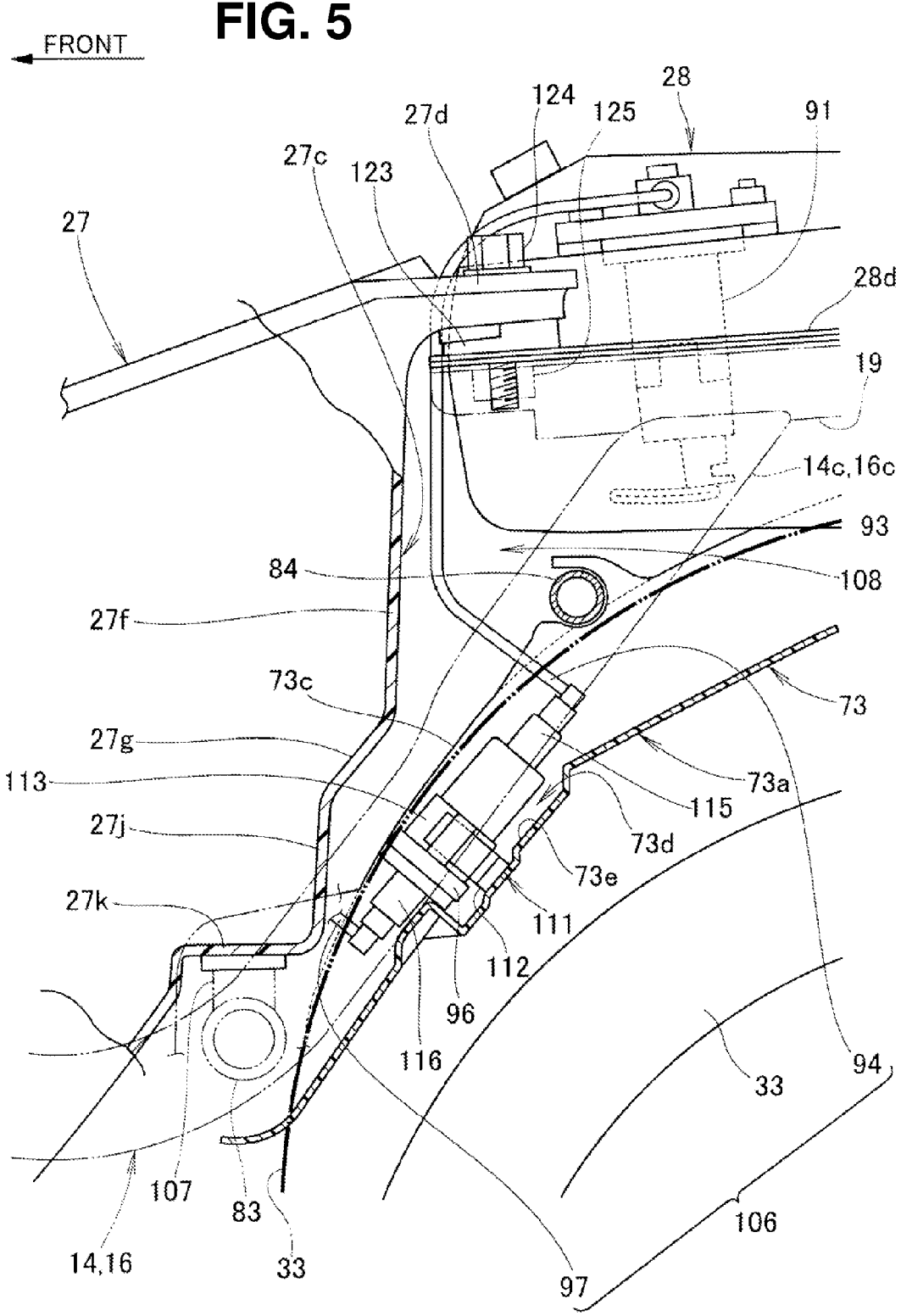
FIG. 5 is a cross-sectional view of a fuel filter for the fuel supply apparatus of the motorcycle according to the illustrative embodiment.

As shown in FIG. 5, on a rear wall 27c of the storage box 27, there are provided: a pair of left and right upper mounting flanges 27d, 27e (only the near reference sign 27d is shown) that project rearwardly so as to be attached to the rear-end extending portion 19; an upper vertical wall portion 27f extending downwardly from these upper mounting flanges 27d, 27e; an upper oblique wall portion 27g extending forward and diagonally downwardly from a lower end of the upper vertical wall portion 27f; a lower vertical wall portion 27j extending downwardly from a lower end of the upper oblique wall portion 27g; and a lower support portion 27k extending forward from a lower end of the lower vertical wall portion 27j, and arranged so as to be supported by the first cross pipe 83 via a rubber support member 107.

The upper vertical wall portion 27f, the upper oblique wall portion 27g, and the lower vertical wall portion 27j of the above-mentioned rear wall 27c are, as a whole, inclined so that the upper vertical wall portion 27f is positioned behind the lower vertical wall portion 27j.

As shown in FIG. 3, the rear fender 73 projects upward in a projecting manner so as to form an arc in order to cover front, upper, and rear portions of the rear wheel 33 (refer to FIG. 1), includes a front portion 73a and a rear portion 73b which are formed at the front and rear with a peak of the arc as a boundary, and has a projecting portion 73c formed in the projecting manner radially outward so as to prevent the interference with the rear wheel 33 over the front portion 73a and the rear portion 73b.

With reference back to FIG. 5, the front portion 73a of the rear fender 73 is disposed so as to face the rear wall 27c of the storage box 27, and is formed so as to gradually separate rearward from the rear wall 27c up to its upper end. Consequently, a space 108 formed between the rear wall 27c of the storage box 27 and the front portion 73a of the rear fender 73 gradually increases in the longitudinal direction up to an upper end of the space 108.

In the front portion 73a of the rear fender 73, a recessed portion 73d recessed toward the rear wheel 33 side is formed at a position facing the rear wall 27c of the storage box 27, specifically the upper inclined wall 27g, and a part of the secondary fuel filter 96 is accommodated in the recessed portion 73d.

The secondary fuel filter 96 is removably held at a bottom 73e of the recessed portion 73d via an integrally or separately provided filter support bracket 111, and is tilted at an incline with a lower end thereof forward of the upper end, as shown. The fuel filter 96 is supported along the rear inclined portions 14c, 16c of the rear frame sections 14, 16 and the projecting portion 73c of the rear fender 73. Note that reference numerals 115, 116 respectively represent connecting assemblies provided at respective end portions of the fuel pipes 94, 97 and connected to the secondary fuel filter 96.

The filter support bracket 111 includes a pair of side holding members 112, 112 (only the near reference sign 112 is shown) projecting from a bottom portion thereof; and a rubber fastening member 113 having holes formed to press-fit to the side holding members 112, 112. The fastening member 113 is fit on to an outer peripheral portion of the secondary fuel filter 96.

Figure 6:
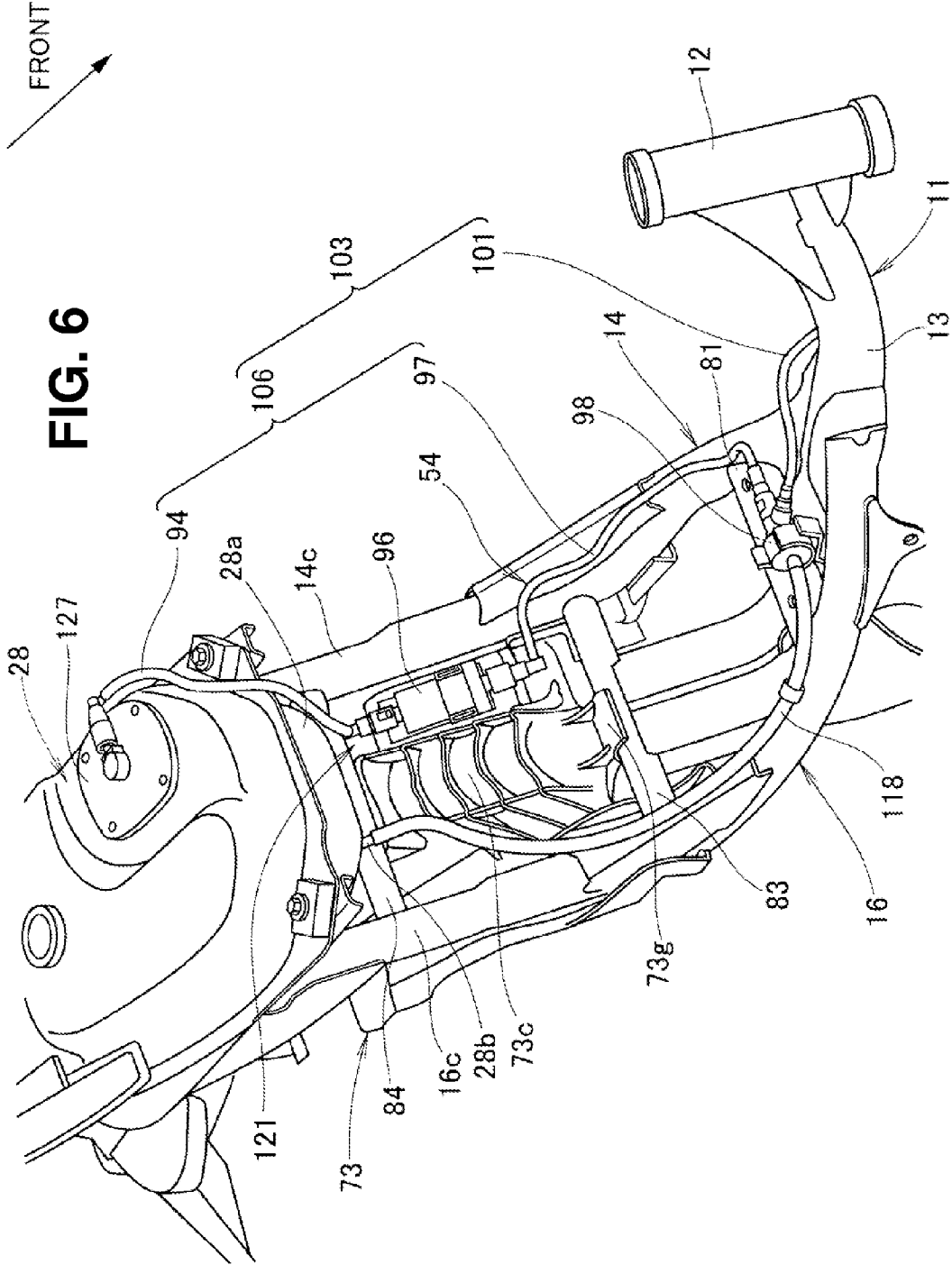
FIG. 6 is a perspective view describing the fuel supply apparatus according to the illustrative embodiment.

As shown in FIG. 6, the rear fender 73 is fastened on to the first and second cross pipes 83, 84 of the vehicle body frame 11. Note that reference number 73g designates a front locking portion provided at a front central portion of the rear fender 73 for engaging the first cross pipe 83, as shown.

The secondary fuel filter 96 is disposed along the rear inclined portions 14c, 16c of the rear frame sections 14, 16 and the projecting portion 73c of the rear fender 73 in a longitudinal direction.

The fuel supply apparatus 54 hereof includes the return pipe 118, one end of which is connected to the pressure regulator 98, and the other end of which is connected to a return port 28b provided at the bottom portion 28a of the fuel tank 28.

The secondary fuel filter 96 is disposed to the left of the projecting portion 73c of the rear fender 73, and between the rear frame sections 14 and 16, i.e., between the projecting portion 73c and the left rear frame section 14.

Out of the space 108 shown in FIG. 5, formed between the rear wall 27c of the storage box 27 and the front portion 73a of the rear fender 73, especially a space 121 shown in FIG. 6, between the projecting portion 73c and the rear frame 14 is a space which has not conventionally been used, and therefore it is possible to effectively utilize the space 121 by disposing the secondary fuel filter 96 in such a space 121, and thereby to make a vehicle body size smaller than where a separate space is otherwise especially provided in the vehicle body to dispose the secondary fuel filter 96.

Furthermore, since the secondary fuel filter 96 is disposed between and along the projecting portion 73c and the rear frame 14, it is possible to easily dispose it even if the space 121 is small, and thereby to utilize the space 121 more effectively.

Figure 7:
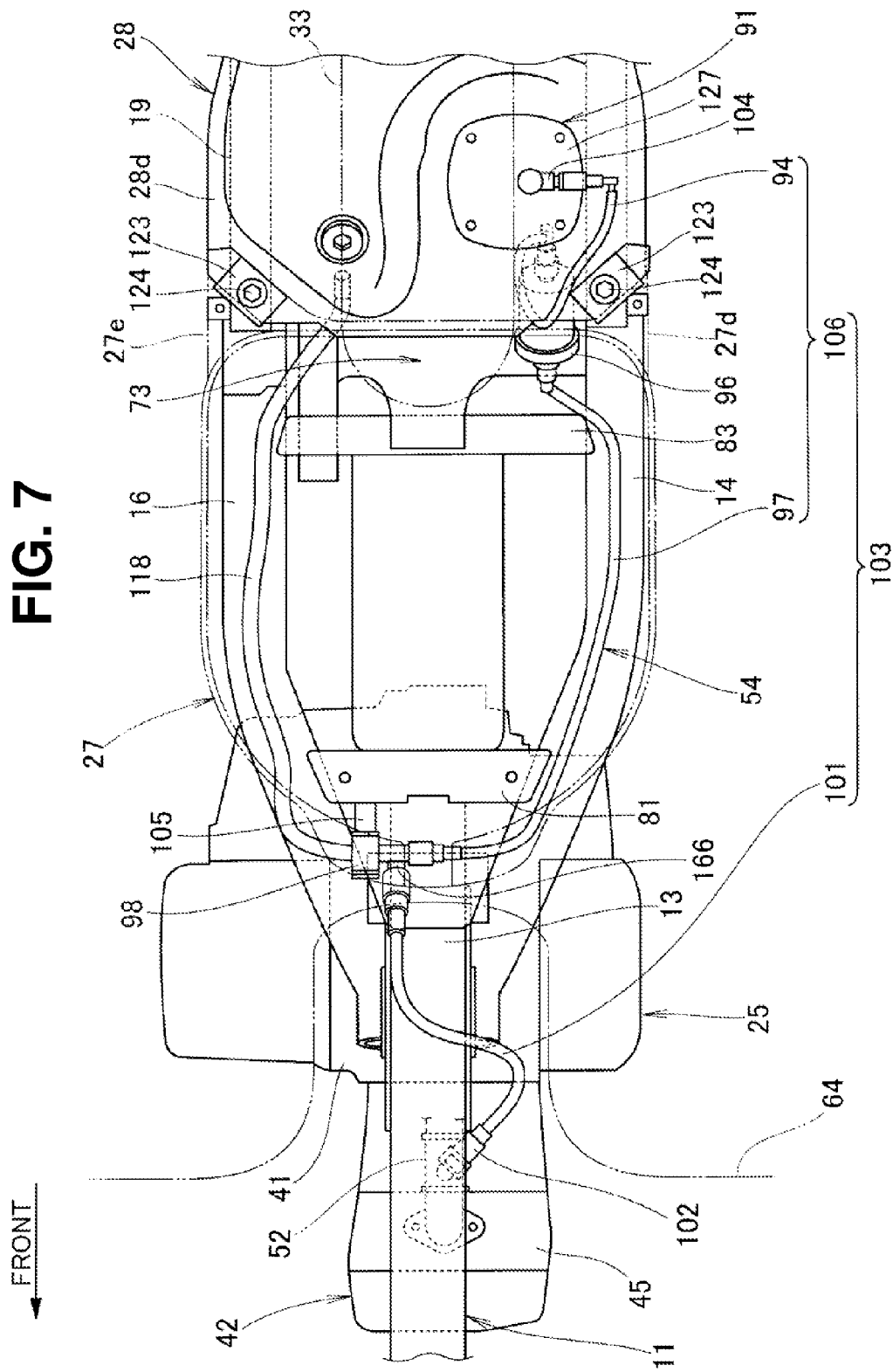
FIG. 7 is a top plan view describing the fuel supply apparatus according to the illustrative embodiment.

As shown in FIG. 7, the upper mounting flanges 27d, 27e of the storage box 27 and the flange portion 28d of the fuel tank 28 are jointly fastened to both front ends of the rear-end extending portion 19 of the rear frame sections 14, 16 via a rubber mount 123 provided between the upper mounting portions 27d, 27e and the flange portion 28d.

Specifically, as shown in FIG. 5, at the left upper mounting portion 27d side of the storage box 27, the flange portion 28d, the rubber mount 123, and the upper mounting portion 27d of the storage box 27 are mounted in this order on the rear-end extending portion 19 of the rear frame sections 14, 16, and a bolt 124 penetrates through the upper mounting portion 27d, the rubber mount 123, the flange portion 28d, and the rear-end extending portion 19, and is screwed into a nut 125 provided in the rear-end extending portion 19.

Likewise, at the right upper mounting portion 27e (refer to FIG. 7) of the storage box 27, the flange portion 28d, the rubber mount 123, and the upper mounting portion 27e of the storage box 27 are mounted in this order on the rear-end extending portion 19 of the rear frame sections 14, 16, and the bolt 124 penetrates through the upper mounting portion 27e, the rubber 123, the flange portion 28d and the rear-end extending portion 19, and is screwed into the nut 125 provided in the rear-end extending portion 19.

Also, as shown in FIG. 7, the fuel pump 91 is provided with a mounting plate 127 at its upper portion, and the mounting plate 127 is attached to a top surface of the fuel tank 28.

The mounting plate 127 is provided with the fuel discharge portion 104 that passes through the mounting plate 127, projects upward, and extends to the left side of the vehicle body.

The fuel pipe 97 of the fuel supply apparatus 54 is disposed above the rear frame 14, extending from the secondary fuel filter 96 to the pressure regulator 98 along the rear frame 14, and the return pipe 118 is disposed above the rear frame 16, extending from the pressure regulator 98 to a lower portion of the fuel tank 28 along the other rear frame 16.

Figure 8:
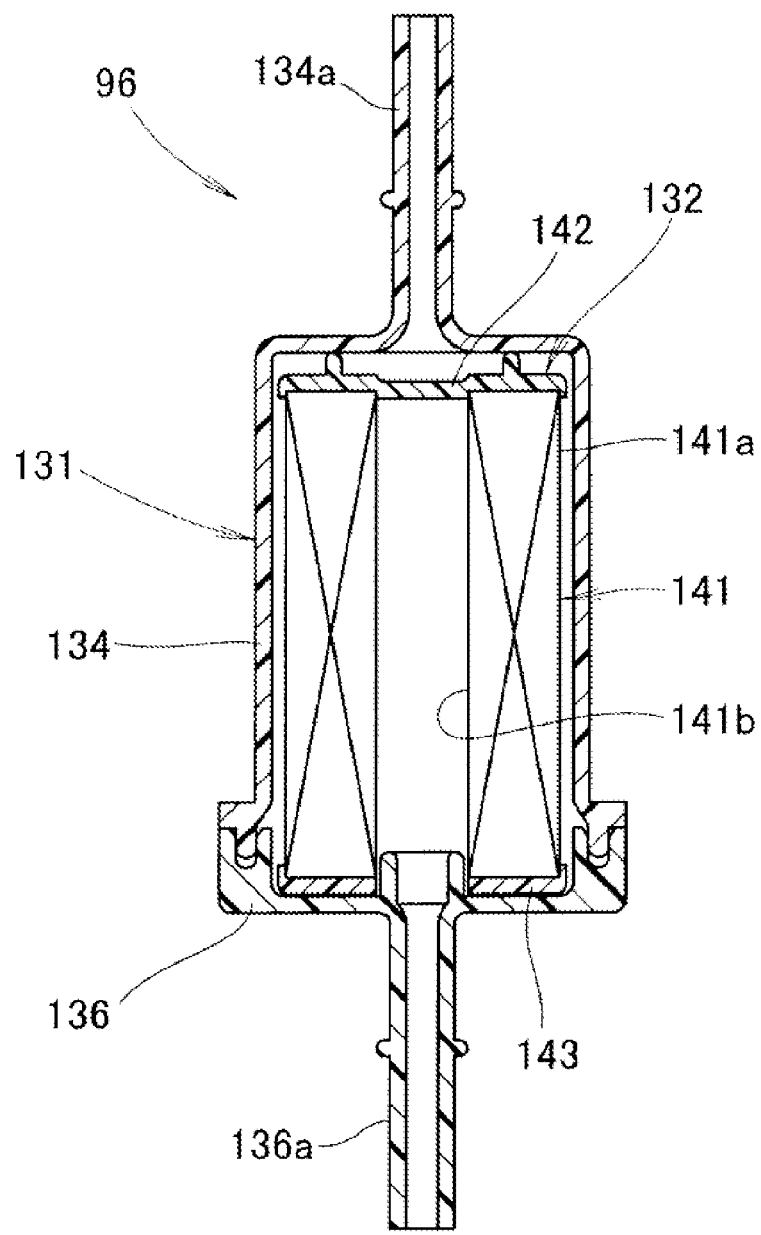
FIG. 8 is a cross-sectional view of the fuel filter according to the illustrative embodiment.

As shown in FIG. 8, the secondary fuel filter 96 includes a filter case 131 and a filter assembly 132 housed inside the filter case 131, and pores of the filter assembly 132 are made finer than those of the primary fuel filter 93 (refer to FIG. 4).

The filter case 131 includes a bottomed tubular case body 134 and a case cover 136 to close an opening portion of the case body 134.

The case body 134 is provided with a fuel suction port 134a that is connected to the fuel pipe 94 (refer to FIG. 5) on the fuel tank 28 (refer to FIG. 5) side for sucking fuel, and the case cover 136 is provide with a fuel discharge port 136a that is connected to the fuel pipe 97 (refer to FIG. 5) on the injector 102 (refer to FIG. 3) side for discharging fuel.

The filter assembly 132 includes a tubular filter element 141 made of a filter paper and frame sections 142, 143 supporting both ends of the filter element 141, and is fixed by sandwiching it between the case body 134 and the case cover 136.

Fuel is sucked into the filter case 131 from the fuel suction port 134a, filtered while flowing to pass from an outer peripheral surface 141a of the filter element 141 to an inner peripheral surface 141b thereof, and then discharged outside the filter case 131 through the fuel discharge port 136a.

Figure 9:
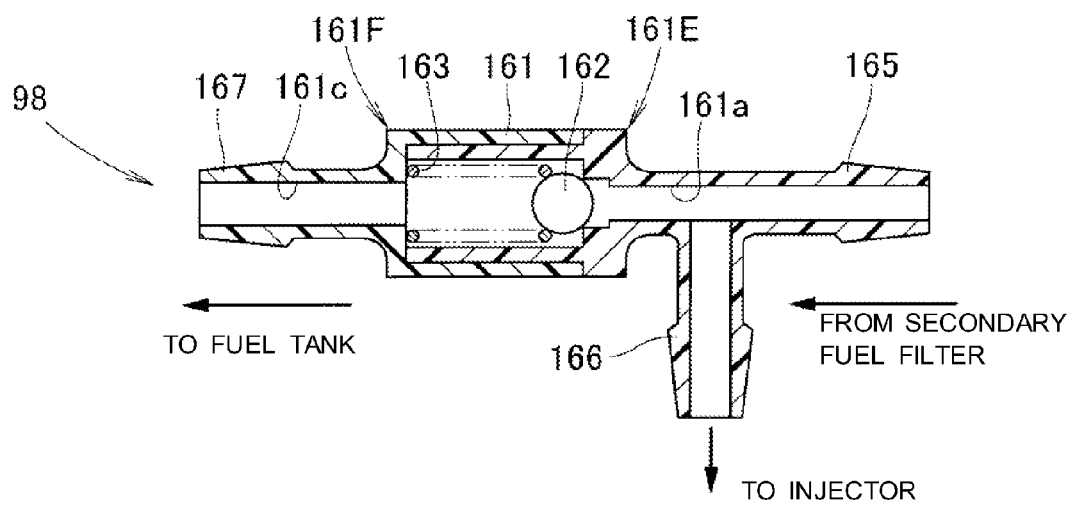
FIG. 9 is a cross-sectional view of a pressure regulator according to the illustrative embodiment.

As shown in FIG. 9, the pressure regulator 98 includes a case 161 with a resin first case 161E and a resin second case 161F joined together; a spherical steel valve element 162 which opens and closes a through-hole 161a opened in a bottom of one end of the case 161; a compression coil spring 163 that presses the valve element 162 to close the through-hole 161a; a fuel suction port 165 in which the through-hole 161a is opened; a fuel discharge port 166 formed at a middle portion of the fuel suction port 165; and a fuel return port 167 having a through-hole 161c that is opened in a bottom of the other end of the case 161.

The fuel suction port 165 is connected to the secondary fuel filter 96 (refer to FIG. 6), the fuel discharge port 166 is connected to the injector 102 (refer to FIG. 3), and the fuel return port 167 is connected to the fuel tank 28 (refer to FIG. 6).

As shown in FIGS. 1, 3, and 7, in the fuel supply apparatus 54 including the storage box 27 disposed below the seat 67 of the motorcycle 10, and the fuel tank 28 disposed behind the storage box 27, the intake air routing structure 47 and the injector 102 as a fuel injection apparatus for the engine 25 being disposed in front of the storage box 27, fuel in the fuel tank 28 being fed under pressure into the injector 102 by the fuel pump 91 disposed inside the fuel tank 28, the pressure regulator 98 being disposed at a middle portion of the fuel routing structure 103 interconnecting the fuel pump 91 and the injector 102, fuel being supplied from the fuel pump 91 to the pressure regulator 98 via the fuel feed pipe 106 as a first supply pipe, fuel being supplied from the pressure regulator 98 to the injector 102 via the fuel delivery pipe 101 as a second supply pipe, and extra fuel being returned from the pressure regulator 98 to the fuel tank 28 via the return pipe 118, wherein the fuel feed pipe 106 and the return pipe 118 are arranged in a substantially U-shaped configuration by placing the pressure regulator 98 at the front of the storage box 27, and by placing the fuel feed pipe 106 and the return pipe 118 on one side and another side of the storage box 27 respectively.

According to the abovementioned configuration, it is possible to make curvatures of the fuel feed pipe 106 and the return pipe 118 relatively gentle, and thereby to minimize or prevent stress concentration.

Also, in the pressure regulator 98, since the fuel feed pipe 106 and the return pipe 118 are connected to one side and the other side in the vehicle width direction respectively, it is possible to shorten the fuel feed pipe 106 and the return pipe 118 by reducing bent portions, and also to easily dispose the fuel feed pipe 106 and the return pipe 118 and reduce a cost thereof.

As shown in FIGS. 1 and 7, since the engine 25 is provided with the cylinder portion 42 projecting forward horizontally, the pressure regulator 98 is disposed above the crankcase 41 of the engine 25 and behind the injector 102, and the fuel delivery pipe 101 as secondary supply piping is disposed along the vehicle body frame 11, specifically the main frame section 13, extending in a longitudinal direction, it is possible to protect the pressure regulator 98 with the crankcase 41 of the engine 25 and also to protect the fuel delivery pipe 101 with the main frame section 13.

Furthermore, since the engine 25 is provided with the horizontal cylinder portion 42, a distance between the pressure regulator 98 and the injector 102 can be made longer in a longitudinal direction than, for example, an engine whose cylinder portion extends upward from a crankcase.

Consequently, it is possible to secure a large capacity in the fuel delivery pipe 101 and thereby suppress fuel pulsation, and also to simplify the layout by extending the fuel delivery pipe 101 in a straighter configuration than might otherwise be needed.

As shown in FIGS. 2 and 7, since the vehicle body frame 11 is provided with a single main frame section 13 extending obliquely downward and rearward from the head pipe 12 and the rear frame sections 14, 16 as a seat frame bifurcating left and right from the main frame section 13 in front of the storage box 27, the pressure regulator 98 is disposed between the left and right rear frame sections 14, 16 in a top plan view, and the fuel delivery pipe 101 is connected, at the rear end thereof, to the fuel discharge port 166 as a front side joint portion provided on the pressure regulator 98, extends while curving over the main frame section 13 from one of the left and right edges of the main frame section 13 to downward of the main frame section 13 above the cylinder portion 42 and within the width of it, and is connected, at a front end thereof, to the injector 102, it is possible to protect the fuel delivery pipe 101 with the main frame section 13 and the cylinder portion 42.

As shown in FIGS. 1 and 5, since the rear wheel 33 of the motorcycle 10 is attached to the rear end of the swing arm 32 vertically-swingably supported by the vehicle body frame 11, and the secondary fuel filter 96 as a fuel filter disposed at a middle portion of the fuel feed pipe 106 is disposed within a swinging range of the rear wheel 33 in a side view, it is possible to easily prevent an interference between the secondary fuel filter 96 and the rear wheel 33 by disposing the secondary fuel filter 96 on one side in the vehicle width direction and outside of the external side of the rear wheel at the time of a maximum movement of the rear wheel (the position of the rear wheel 33 at this time is shown in FIG. 7).

As shown in FIGS. 1 and 7, since the fuel feed pipe 106, the return pipe 118, the secondary fuel filter 96, and the pressure regulator 98 are disposed inside the vehicle body frame 11 in a top plan view, and the leg shield 64 to cover legs of the occupant sitting on the seat 67 from the front covers the fuel delivery pipe 101 at the rear of the center thereof, it is possible to protect the fuel feed pipe 106, the return pipe 118, the secondary fuel filter 96, and the pressure regulator 98 with the vehicle body frame 11 and improve the appearance by covering the pressure regulator 98 with the leg shield 64, and thus there is no need for providing a special cover member to cover the pressure regulator 98, allowing a reduction in the number of components.

Also, since the fuel contains ethanol and ethanol concentration in the fuel is determined from components of the exhaust gas from the engine 25 by means of the ECU 60 as a control apparatus, the fuel injection control by the injector 102 is switched according to the ethanol concentration, and the fuel delivery pipe 101 is made of a rubber hose, it is possible to suppress the pulsation of fuel fed into the injector 102 and thereby stabilize the combustion of the engine 25 by employing the flexible rubber hose for the fuel delivery pipe 101.

Furthermore, since the fuel injection control by the injector 102 is switched by the ECU 60 according to ethanol concentration, it is possible to appropriately control the combustion of the engine 25 and thereby improve engine performance.

As shown in FIG. 7, since the fuel feed pipe 106 and the return pipe 118 may be made of a resin hose, the outer diameters of the fuel feed pipe 106 and the return pipe 118 can be reduced, and it is possible to make a piping work easier especially for a small vehicle with a small body space and also reduce the cost as compared to a rubber hose.

As shown in FIGS. 5 and 7, since the fuel pump 91 is provided with the fuel discharge port 104 as a fuel discharge joint passing through the mounting plate 127 closing an opening in the top of the fuel tank 28 and bending to one side in the vehicle width direction, and the fuel feed pipe 106 is connected to the fuel discharge port 104 from one side in the vehicle width direction, it is possible to make it easier to dispose the fuel feed pipe 106 on one side in the vehicle width direction.

As shown in FIG. 4, the seat 67 is of the tandem type having the rider's seat 67a at the front and the pillion passenger seat 67b at the rear to allow two persons to seat, the stepped portion 67c is formed between the rider's seat 67a and the pillion passenger seat 67b, and the fuel discharge port 104 is provided below the stepped portion 67c, it is possible to secure a seat thickness even if the fuel discharge port 104 projecting upward is provided, thus allowing a comfortable ride to be maintained.

A fuel supply apparatus of the illustrative embodiment is preferably configured and arranged for installation on a motorcycle or a similar saddle-type vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle having a vehicle body frame, an engine operatively attached to the vehicle body frame, a seat disposed on the vehicle body frame, and a storage box disposed on the vehicle body frame below the seat, the improvement comprising a fuel supply apparatus comprising:
   a fuel tank provided behind the storage box and having a fuel pump disposed therein;
   an intake air routing structure and a fuel injector disposed in front of the storage box, where the fuel supply apparatus is configured and arranged to deliver fuel into the intake air routing structure via the fuel injector during operation of the motorcycle; and
   fuel supply piping interconnecting the fuel pump and the fuel injector and having a pressure regulator disposed in fluid communication therewith, wherein fuel from the fuel tank is pressure-fed to the fuel injector by the fuel pump via said fuel supply piping, fuel being supplied from the fuel pump to the pressure regulator via a fuel feed pipe of said fuel supply piping, fuel being supplied from the pressure regulator to the fuel injector via a fuel delivery pipe of said fuel supply piping, and excess fuel being returned from the pressure regulator to the fuel tank via a fuel return pipe,
   wherein the pressure regulator is disposed in front of the storage box;
   wherein the fuel feed pipe and the fuel return pipe are disposed on one side and another side of the storage box and are interconnected by the pressure regulator; and wherein the fuel feed pipe and the fuel return pipe cooperate to form a substantially U-shape;
   wherein a rear wheel of the motorcycle is attached to a rear end of a swing arm and supported by the vehicle body frame so as to be swingably movable up and down;
   and wherein a fuel filter, situated at a middle portion of the fuel feed pipe, is disposed within a swingable range of the rear wheel as viewed in a side view.

2. The fuel supply apparatus according to claim 1, wherein the fuel feed pipe and the fuel return pipe are connected respectively to one side and another side, across the vehicle body frame, of the pressure regulator.

3. The fuel supply apparatus according to claim 1, wherein the engine is provided with a cylinder portion projecting substantially horizontally forward;
   wherein the pressure regulator is disposed above a crankcase of the engine and behind the fuel injector; and
   wherein the fuel delivery pipe is disposed extending along the vehicle body frame in a substantially longitudinal direction.

4. The fuel supply apparatus according to claim 1, wherein the vehicle body frame comprises a head pipe, a main frame section extending obliquely downwardly and rearwardly from the head pipe, and a seat frame bifurcated left and right from the main frame section in front of the storage box to form left and right seat frame sections;
   wherein the pressure regulator is disposed between the left and right seat frame sections as viewed in a top plan view; and wherein a rear end of the fuel delivery pipe is connected to a front side joint portion provided on the pressure regulator, and extends in a curve from one of left and right edges of the main frame section over the main frame section to an area above a cylinder portion and within the left and right width of the cylinder portion so that the front end of the fuel delivery pipe is connected to the fuel injector.

5. The fuel supply apparatus according to claim 1, wherein the fuel feed pipe, the fuel return pipe, the fuel filter, and the pressure regulator are disposed inside the vehicle body frame as seen in top plan view;
wherein a leg shield is attached to the vehicle body frame for covering the legs of an occupant riding on the motorcycle, and wherein a rear central portion of the leg shield extends in front of the fuel delivery pipe.

6. The fuel supply apparatus according to claim 1, wherein:
the engine is configured to operate on a fuel which contains ethanol,
ethanol concentration in the fuel is determined from sensing components of an exhaust gas from the engine,
control of fuel injection by the fuel injector is switched according to the ethanol concentration;
and the fuel delivery pipe comprises an ethanol-tolerant rubber hose.

7. The fuel supply apparatus according to claim 1, wherein the fuel feed pipe and the fuel return pipe are made of a plastic resin material.

8. The fuel supply apparatus according to claim 1, wherein the fuel pump is provided with a fuel discharge joint passing through a flange that closes an opening in a top surface of the fuel tank and bends toward one side in a vehicle width direction; and wherein the fuel feed pipe is connected to the fuel discharge joint from one side in the vehicle width direction.

9. The fuel supply apparatus according to claim 8, wherein the seat is of a tandem type having front and back seating portions for allowing two persons to sit thereon; and wherein a stepped portion is formed between the front and back seating portions, and the fuel discharge joint is provided below the stepped portion.

10. A motorcycle comprising:
a vehicle body frame,
an engine operatively attached to the vehicle body frame,
a seat disposed on the vehicle body frame,
a storage box disposed on the vehicle body frame below the seat,
a fuel tank provided behind the storage box and having a fuel pump disposed therein;
an intake air routing structure and a fuel injector disposed in front of the storage box, where the fuel injector is configured and arranged to deliver fuel into the intake air routing structure during operation of the motorcycle;
wherein fuel from the fuel tank is pressure-fed to the fuel injector by the fuel pump disposed inside the fuel tank, a pressure regulator disposed in fluid communication with fuel supply piping interconnecting the fuel pump and the fuel injector, fuel being supplied from the fuel pump to the pressure regulator via a fuel feed pipe of the fuel supply piping, fuel being supplied from the pressure regulator to the fuel injector via a fuel delivery pipe of the fuel supply piping, and excess fuel being returned from the pressure regulator to the fuel tank via a fuel return pipe,
wherein the pressure regulator is disposed in front of the storage box;
wherein the fuel feed pipe and the fuel return pipe are disposed on one side and another side of the storage box and are interconnected by the pressure regulator;
wherein the fuel feed pipe and the fuel return pipe cooperate to form substantially a U shape;
wherein a rear wheel of the motorcycle is attached to a rear end of a swing arm and supported by the vehicle body frame so as to be swingably movable up and down; and
wherein a fuel filter, situated at a middle portion of the fuel feed pipe, is disposed within a swingable range of the rear wheel as viewed in a side view.

11. The motorcycle according to claim 10, wherein the fuel feed pipe and the fuel return pipe are connected respectively to one side and another side, across the vehicle body frame, of the pressure regulator.

12. The motorcycle according to claim 10, wherein the engine is provided with a cylinder portion projecting substantially horizontally forward;
wherein the pressure regulator is disposed above a crankcase of the engine and behind the fuel injector;
and wherein the fuel delivery pipe is disposed extending along the vehicle body frame in a substantially longitudinal direction.

13. The motorcycle according to claim 10, wherein the vehicle body frame comprises a head pipe, a main frame section extending obliquely downwardly and rearwardly from the head pipe, and a seat frame bifurcated left and right from the main frame section in front of the storage box to form left and right seat frame sections;
the pressure regulator is disposed between the left and right seat frame sections as viewed in a top plan view; and
a rear end of the fuel delivery pipe is connected to a front side joint portion provided on the pressure regulator and extends in a curve from one of left and right edges of the main frame section over the main frame section to an area above a cylinder portion and within the left and right width of the cylinder portion so that the front end of the fuel delivery pipe is connected to the fuel injector.

14. The motorcycle according to claim 10, wherein the fuel feed pipe, the fuel return pipe, the fuel filter, and the pressure regulator are disposed inside the vehicle body frame as seen in top plan view;
wherein a leg shield is attached to the vehicle body frame for covering the legs of an occupant riding on the motorcycle, and wherein a rear central portion of the leg shield extends in front of the fuel delivery pipe.

15. The motorcycle according to claim 10, wherein: fuel contains ethanol, ethanol concentration in fuel is determined from sensing components of an exhaust gas from the engine, and control of fuel injection by the fuel injector is switched according to the ethanol concentration; and
the fuel delivery pipe comprises an ethanol-tolerant rubber hose.

16. The motorcycle according to claim 10, wherein the fuel feed pipe and the fuel return pipe are made of a plastic resin material.

17. The motorcycle according to claim 10, wherein the fuel pump is provided with a fuel discharge joint passing through a flange that closes an opening in a top surface of the fuel tank and bends toward one side in a vehicle width direction; and wherein the fuel feed pipe is connected to the fuel discharge joint from one side in the vehicle width direction.

18. The motorcycle according to claim 17, wherein the seat is of a tandem type having front and back seating portions for allowing two persons to sit thereon; and wherein a stepped portion is formed between the front and back seating portions and the fuel discharge joint is provided below the stepped portion.

* * * * *